United States Patent [19]

Umemura et al.

[11] Patent Number: 5,097,792
[45] Date of Patent: Mar. 24, 1992

[54] COATING APPARATUS

[75] Inventors: Masahiro Umemura; Setsuko Kawahara; Takemasa Namiki; Seiichi Tobisawa; Shigetoshi Kawabe; Takeshi Nakajima; Yasushi Nakano; Noboru Koyama, all of Hino, Japan

[73] Assignee: Konica Corporation, Tokyo, Japan

[21] Appl. No.: 490,742

[22] Filed: Mar. 8, 1990

[30] Foreign Application Priority Data

Mar. 20, 1989 [JP] Japan .................... 1-69062
Mar. 24, 1989 [JP] Japan .................... 1-73009

[51] Int. Cl.$^5$ .................... B05C 3/18; B05C 5/02
[52] U.S. Cl. .................... 118/314; 118/315; 118/325; 118/411; 425/113
[58] Field of Search ................ 118/315, 411, 314, 313, 118/325, 407, 410; 427/286; 425/113

[56] References Cited

U.S. PATENT DOCUMENTS

| | | | |
|---|---|---|---|
| 3,240,621 | 3/1966 | Flower, Jr. et al. | 427/286 X |
| 3,928,678 | 12/1975 | Jackson | 118/411 X |
| 4,424,762 | 1/1984 | Tanaka et al. | 118/410 |
| 4,480,583 | 11/1984 | Tanaka et al. | 118/410 |
| 4,537,801 | 8/1985 | Takeda | 118/411 X |
| 4,681,062 | 7/1987 | Shibata et al. | 118/407 X |
| 4,842,900 | 6/1989 | Miyamoto | 118/411 X |
| 4,854,262 | 8/1989 | Chino et al. | 118/411 |
| 4,863,765 | 9/1989 | Ishizuka | 118/411 X |

FOREIGN PATENT DOCUMENTS

| | | |
|---|---|---|
| 3144655 | 7/1982 | Fed. Rep. of Germany . |
| 3733031 | 4/1988 | Fed. Rep. of Germany . |
| 60-238179 | 11/1985 | Japan .................... 118/411 |
| 63-88080 | 4/1988 | Japan .................... 118/411 |

*Primary Examiner*—Richard L. Chiesa
*Attorney, Agent, or Firm*—Jordan B. Bierman

[57] ABSTRACT

A coating apparatus having a first slot between its front and center edges and a second slot between its center and back edges, wherein a coating solution is extruded continuously from each of the slots onto the surface of a flexible support running continuously along the edge surfaces of the front, center, and back edges in that order.

The front edge surface has a straight-line portion on at least the terminal end portion of the front edge so that the straight-line portion extends along the direction of movement of the support and is not longer than one mm, and at least one portion of the center and back edge surfaces protrudes from the extension line of the straight-line toward the support.

The coating apparatus is suitable for preparing magnetic recording media.

7 Claims, 4 Drawing Sheets

COATING APPARATUS

BACKGROUND OF THE INVENTION

This invention relates to an extrusion type coating apparatus and particularly to a coating apparatus capable to carrying out a coating operation without trouble even under the high-speed coating conditions when manufacturing magnetic recording media.

As for the coating systems, there have been well known various systems including a roll-coat system, a gravure-coat system, an extrusion-coat system, a slide-bead-coat system, and a curtain-coat system.

Magnetic recording media may be obtained by coating a magnetic coating solution on a support. The coating systems applicable therefor include, generally, the roll-coat, gravure-coat and extrusion-coat systems. Among these systems, the extrusion-coat system is superior to others, because a uniform thickness of coated-layers can be obtained.

In recent years, on the other hand, magnetic recording media have been rapidly improved, and oxidized magnetic powder with a high BET value and barium ferrite materials have been used so that coating solutions have been highly thickened. Further, with the purpose of improving productivity, there have been increasing demands for high-speed coating operations.

As for the extrusion-coat systems mainly for preparing magnetic recording media, there are known conventional techniques such as those described in Japanese Patent Publication Open to Public Inspection (hereinafter referred to as Japanese Patent O.P.I. Publication) Nos. 57-84771/1982, 58-104666/1983 and 60-238179/1985.

In recent years, multi-layered magnetic recording media have been tried, because a higher density and thinner layers or a more data storage was desired. To meet these requirements, there have been proposed double-layer coating apparatuses such as that described in Japanese Patent O.P.I. Publication No. 63-88080/1988.

In the above-mentioned extrusion coat systems, a uniform thickness of coated layers can be obtained. However, satisfactory coating conditions may be obtained only within a limited range. Accordingly, there may be often instances where a desirable coating operation may hardly be made under the above-described high-speed coating conditions.

The serious difficulties which arise in coating operations and particularly in thin-layer coating operations (for making a layer not thicker than 30 μm) include, for example, a coated area is blanked out by foreign material getting caught or adhering to a support; dust or other coagulated substances in the coating solution depositing on the back edge surface; some portions of the layer being coated being thicker than others, especially in the longitudinal direction; and scraping of the support by the front edge portion, especially by the square portion of the downstream end thereof, thereby producing shavings which adhere to the apparatus. Particularly when coating a very viscous solution, cross-streaking is likely due to undersired movement of the support, thereby producing noise or fluctuations in output.

To solve the above-mentioned difficulties, various countermeasures have been devised. A typical example thereof is the technique described in Japanese Patent O.P.I. Publication No. 60-238179/1985. (hereinafter referred to a Prior Art 1)

In Prior Art 1, bubbles or pinholes caused by coating are moving, air is prevented from being sucked into gap between the surface of a support and a front edge surface by squeezing the downstream end of the front edge surface.

In this Prior Art 1, however, the travelling angle of a support is sharply changed at the downstream end of the front edge surface, so that the contact pressure of the support on the downstream end thereof may be concentrated at the downstream end however, the support surface is scraped by the downstream end, so that there may be high frequency problems caused by shavings of the support on the coated surface.

On the other hand, the double-layer coating apparatus cited in Japanese Patent O.P.I. Publication No. 63-88080/1988 (hereinafter referred to as Prior Art 2) is also based on the same idea as in the above-described Prior Art 1, so that the adhesion of the support base shavings may not be avoided.

In other words, in the above-cited Publication, it is regarded as preferable that, in FIG. 4, $\theta_1$, $\theta_2$ and $\theta_3$ each have the following relationship:

$$0.5° < \theta_1 \leq 35°$$

$$0° < \theta_2 \leq 25°$$

$$0° < \theta_3 \leq 20°$$

However, if the above relationships are observed, the device is likely to produce base shavings at downstream end X of a front edge surface and to scrape the first layer coating solution away from the downstream end of a center edge surface.

Even though the above-mentioned problems may be partly solved by reducing the contact pressure of the head surface of a coating apparatus on a support, the contact pressure should be increased to some extent when a high-speed coating is to be stably made. In this case, the above-described problems still remain unsolved.

It is therefore a principal object of the invention to provide a coating apparatus capable of firmly preventing a difficulties in base shaving adhesion and a bubble or pin-hole formation in a support surface caused by sucking the air at the interface between layers.

SUMMARY OF THE INVENTION

In the coating apparatus of the invention a coating solution is extruded continuously from the first slot into a gap between front and from center edges and the second slot into a gap between the center and back edges so that the coating solution is coated on the surface of a flexible support which is continuously travelling in order along the front, center and back edge surfaces. The front edge surface has a straight portion having a length of not longer than 1 mm at least at the terminal end of the surface so as to be along the travelling direction of the support, and at least one portion of the center and back edge surfaces protrudes from the extended line of the straight portion on the support side.

Figure 1:
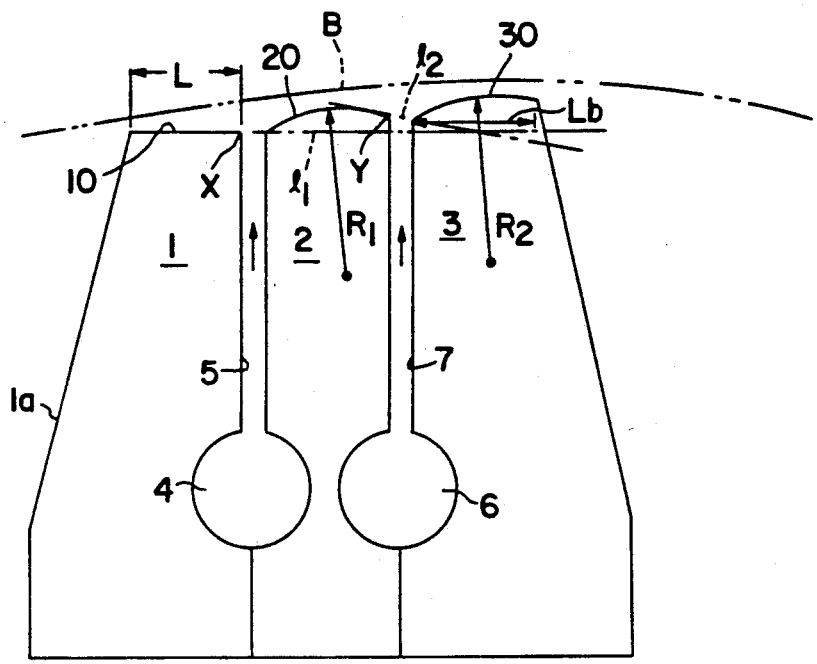
FIG. 1 is a transverse cross-sectional view of an example of the invention.

In this invention, as shown in FIG. 1, front edge surface 10 has a straight portion and at least one portion of center edge surface 20 and the back edge surface 30 protrudes from extended line $l_1$ of the straight portion toward support B. Therefore, the working force of support B on the edge surfaces is distributed to front end G of the front edge surface and center and back edge surfaces 20 and 30 through the coating solutions, and the contact force of the terminal end X of front edge surface 10 on support B will almost eliminated, so that the base shaving problem is prevented without scraping support B at terminal end X.

On the other hand, support B approaches front end G of front edge surface 10 and is then squeezed at the front end G. Therefore, the air sucked from support B into the interface between layers is prevented.

If this is the case, there may be some concern about the base being scraped by bringing it into contact the front end G. However, support B tends to be separated from front edge surface 10 by the flux of the coating solution so as to reduce the contact pressure of support Bon to front end G to such an extent that the base will not be scraped away. Therefore, no base shaving problem exists.

DETAILED DESCRIPTION OF THE PREFERRED EMBODIMENTS

The invention will now be described in greater detail
FIG. 1 is a transverse cross-sectional view of a coating apparatus relating to the invention, wherein front edge 1 is provided upstream of the travelling direction of support B, center edge 2 in the middle; and back edge 3 on the downstream side. First slot 5 is formed between front edge 1 and center edge 2 so as to be connected to first pocket 4 of a coating solution, and second slot 7 between center edge 2 and back edge 3 so as to be connected to second pocket 6 of the coating solution.

Front edge surface 10 of front edge 1, which is opposite to support B, has a straight portion in the travelling direction of support B. A length L of the straight portion is to be not longer than 1 mm. If it exceeds 1 mm, support B is forced to be floated by the pressure of the first coating solution. In this situation, air may be sucked into the interface between layers.

In addition, at least one portion of center edge surface 20 and back edge surface 30 protrudes toward the side of support B from extended line $l_1$ of the straight portion. In the example shown in FIG. 1, both of center edge surface 20 and back edge surface 30 protrude from extended line $l_1$.

Figure 2:
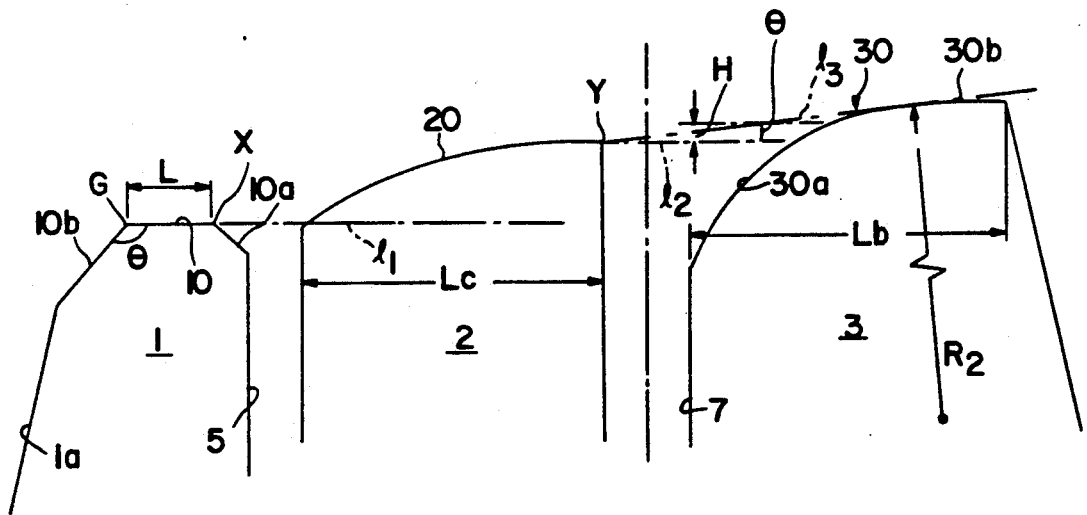
FIG. 2 is a transverse cross-sectional view of the substantial portions of a modified example.

The term, the terminal end of the front edge surface, stated in this invention, is defined as the terminal end which does not directly intersect the surface on the side of front edge 1 of first slot 5 and, when it has a curved or straight chamfered portion 10a as shown in FIG. 2, it also includes such chamfered portion 10a. Such straight portion is not necessary to occupy the whole front edge 10, but may have introduction surface 10b between front edge surface 10 and the front surface 1a of front edge 1. In this case, an angle made between introduction surface 10b and the straight portion should preferably be within the range of 135 to 170 degrees, from the viewpoint of preventing the air from being sucked into the interface between layers at the corner G.

It is not necessary that all of center edge surface 20 protrude. from extended line $l_1$, but only a part thereof may protrude therefrom. The case of back edge surface 30 is the same as above.

Center edge surface 20 and back edge surface 30 are not always to be made arced or curved, but may be made straight. It is, however, preferable that at least the latter half portions of center edge surface 20 and back edge surface 30 should be made arced, since the layer thickness may be well controlled by gradually thinning the thickness of a coating solution flowed from slot 5 or 7 to be applied to support B.

In such a case as described above, the radius of the curvature $R_1$ of center edge surface 20 should preferably be 2 mm $<R_1 \leq 25$ mm. And, the radius of the curvature of back edge surface should preferably be 2 mm $<R_2 \leq 25$ mm.

Thickness Lc of center edge 2 should preferably be $R_1/20$ to $R_1$ and, further, thickness Lb of back edge 3 should preferably be $R_2/20$ to $R_2$. Besides, it is preferable that back edge surface 30 protrudes toward the side of support B from tangent $l_2$ at terminal end Y of center edge surface 20, and that angle 0 between tangent $l_2$ at terminal end Y of center edge surface 20 and tangent $l_3$ extended from terminal Y to back edge surface 30, such angle $\theta_3$ should have the following relation:

$$0° < \theta_3 < 38°$$

Figure 3:
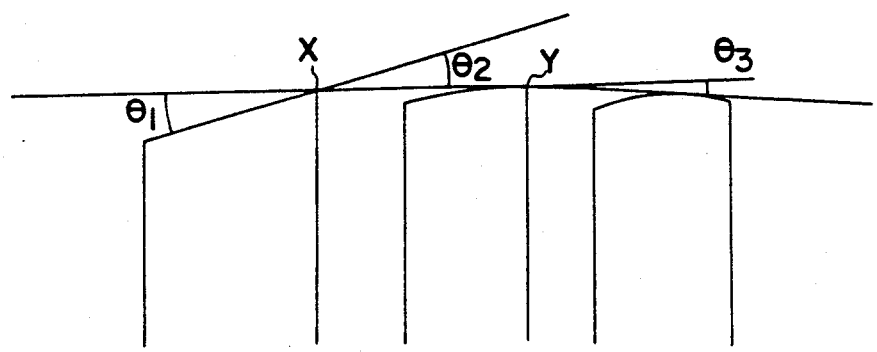
FIG. 3 is a transverse cross-sectional view of a coating apparatus relating to Prior Art 2.

In Prior Art 2 as shown in FIG. 3, $\theta_3$ is preferably minus. According to the knowledge of the inventors, however, the first coating solution may be scraped at terminal end Y of center edge surface 20, when back edge surface 30 is below tangent $l_2$ at the terminal end Y, so that the coatability of the first layer may be worsened. It is, therefore, preferable that at least the latter half of back edge surface 30 should protrude from tangent $l_2$ at terminal end Y of center edge surface 20.

In a coating apparatus constituted as above, the first layer is coated with the first coating solution flowed from first slot 5 and the second layer with the second coating solution from the second slot 7, in the situation where support B travels in the direction of the arrow over to front edge surface 10, center edge surface 20 and back edge surface 30, in that order.

The supports relating to the invention include, for example, those made of plastic films such as polyester film, a sheet of paper, the laminated sheets thereof, and a metal sheet. They are useful regardless of their materials, provided they are flexible.

The coating solutions, when using magnetic coating solutions and, particularly, those having a 500 cps (measured one minute after running a B type viscosimeter at 60 rpm), can display the effects of the invention. Besides the above, any photographic light sensitive coating solutions may also be applicable.

[EXAMPLES]

Next, the effects of the invention will be clarified with reference to the following examples.

(EXAMPLE 1)

A sheet of magnetic recording medium was prepared in the manner that a 15 μm-thick polyethyleneterephthalate film was used as the support thereof, and the magnetic coating solution comprising the lower and upper layer coating solutions each having the following compositions were coated on the support so that the both dried layer thicknesses may be 3.0 μm and 1.0 μm, respectiely. The viscosities of the upper and lower layer coating solutions were 1000 cps and 1500 cps, respectively.

| The upper layer coating solution | |
|---|---|
| Co-containing magnetic iron oxide | 150 wt. parts |
| Polyurethane resin | 10 wt. parts |
| Vinyl chloride-vinyl acetate copolymer | 20 wt. parts |
| Alumina powder | 10 wt. parts |
| Myristic acid | 2 wt. parts |
| Butyl stearate | 1 wt. part |
| Polyisocyanate | 10 wt. parts |
| Toluene | 200 wt. parts |
| Methylethyl ketone | 200 wt. parts |
| Carbon black | 10 wt. parts |
| The lower layer coating solution | |
| Co-containing magnetic iron oxide | 150 wt. parts |
| $\alpha$-$Al_2O_2$ | 8 wt. parts |
| Carbon black | 5 wt. parts |
| Vinyl chloride copolymer | 20 wt. parts |
| Polyurethane resin | 7 wt. parts |
| Butyl stearate | 1 wt. part |
| Myristic acid | 0.65 wt. parts |
| Stearic acid | 0.35 wt. parts |
| Methylethyl ketone | 150 wt. parts |
| Toluene | 150 wt. parts |
| Oleic acid | 0.65 wt. parts |
| Polyisocyanate | 10 wt. parts |

In this example, both of the coating apparatus relating to the invention and that relating to Prior Art 2 were used to check up the coatabilities, while changing their coating speeds. The results obtained are shown in Table 1.

TABLE 1

| Coating speed | Prior Art example | Inventive example |
|---|---|---|
| 100 m/min. | ○ | ○ |
| 200 m/min. | Δ-○ | ○ |
| 300 m/min. | Δ | ○ |
| 400 m/min. | x | ○ |

In Table 1,
x: Frequent occurrence of base-shaving adhesion
Δ: Some base-shaving adhesion found
Δ-○: Base-shaving adhesion partly found
○: Coatability, excellent In observing them the samples evaluated as x and Δ were found, with the naked eye, to be unevenly coated. Therefore, the coating operations were stopped after coating only about 100 meters. The other samples were coated not less than 500 meters.

In the examples of the invention. L=0.3 mm, $R_1$=8 mm, $R_2$=16 mm, Lc=Lb=2.6 mm, and $\theta_3$=10°.

In recent years, magnetic powders having a smaller particle-size have been used as magnetic materials and, particularly, recording media for video and computer use to meet the high density and high S/N requirements.

It is generally said that the S/N ratio (in playback) of a magnetic recording medium (hereinafter referred to as a magnetic tape) is proportionate to a square root of the particle number of the magnetic powder used in a recording material. In the case of coating magnetic powder having a certain weight, the smaller the particle size thereof is, the more the S/N ratio thereof is advantageously improved.

However, as the magnetic particles become finer, dispersion becomes harder because of the increase in their surface activity.

On the other hand, when making magnetic powder fine and its BET value higher, the surface of a magnetic layer is flatter which engenders deterioration in tape-running durability. In other words, a magnetic tape such as described above seriously scratches a magnetic head when recording or playing back. Therefore, the scratched area and friction coefficient increase deterioration in tape-running property. These increases also produce the undesirable chain reaction of such magnetic layer abrasion caused by repeated use magnetic powder falling from the layer, and the magnetic head clogging caused by falling magnetic powder.

To the video tapes required to have a higher S/N ratio, for example, it is advisable to apply a method in which magnetic powder is made finer and, at the same time, the fillers such as carbon black and abrasives other than magnetic powder are removed from the magnetic layer so as to making the filling degrees of magnetic powder higher.

However, if carbon black is removed from a magnetic layer of a magnetic tape, the optical density thereof is so lowered that the tape-running may hardly be controlled or may sometimes stop running and, besides, the tape-running durability is hindered by an electric charge because of the elimination of conductivity.

When running a magnetic tape on a video deck, the tape surface is scratched by guide-poles and guide-rollers. Therefore, if the tape-running property is poor, not only does the tape running become so erratic that the tape tension is radically varied sufficiently to damage the magnetic layer of the tape or to permit the magnetic powder to fall off. Also the take-up tension of the tape is so varied that the tape is irregularly rolled to have an uneven selvage, so that the tape runs erratically in repeated use and the image or electromagnetic characteristics deteriorate to produce, for example, skew, jitter and S/N problems.

For improving the characteristics, there have been some proposals for reducing the above-mentioned frictional resistance in such a manner that an inorganic powder is dispersively contained in the binders of a BC layer to make their surfaces rough to reduce the areas of the layer surfaces coming into contact with guide poles and the like. (Refer, for example, to Japanese Patent O.P.I. Publication Nos. 57-130234/1982, 57-53825/1982, 58-161135/1983 and 58-2415/1983.)

There is another proposal (such as Japanese Patent Examined Publication No. 52-17401/1977) for the application of carbon black in place of the above-mentioned inorganic powder, so as to try to display the antistatic and light-shielding effects based on the conductivity of carbon black and the surface-roughening effect based on the carbon black particles. However, the dispersibility of carbon black is seriously low and the surface of a magnetic layer formed with this dispersed solution is coarsely roughened by cohered particles, and the cohered particles are apt to fall off because the bonding strength thereof to binders is not high.

As the countermeasures for preventing the above-described problems, there are proposals for providing an under/coat layer of a resin containing carbon black, such as those disclosed in Japanese Patent O.P.I. Publication Nos. 58-164020/1083, 61-276120/1986 and 62-188018/1987.

However, the carbon black dispersibility of such a undercoat layer is still so low that the surface unevenness is produced resulting in unevenness of the magnetic layer surface. This unevenness will then lower the S/N. Besides the above, such layers are susceptible to defects such as a layer peeling, because of a weak adhesive property among the support, under-coat layer, and magnetic layer. Also in the case of a double-laminated magnetic layer, the same hindrance may occur when carbon black is added collectively into only the lower layer of the magnetic layer.

For dispersing the above-mentioned magnetic powder and fillers, it has been necessary to knead them for a long time and to use a large quantity of fillers. Such operation naturally damages the characteristics and causes deterioration of the physical properties of the surface of the magnetic layer, so that it has been difficult to improve the dispersability and also meet the necessary requirements for reliable magnetic tape.

In view of the above, modified resins having an anionic functional group on the binder resins to assist the dispersion have been laid on the table for consideration, and the effects thereof have been recognized. However, the dispersibility (especially of carbon black) of a magnetic powder having a high BET value especially to carbon black has been as yet not quite satisfactory.

Magnetic recording media comprising a triple-laminated magnetic layers have so far been known. However, they have not been suitable for color video tapes which are required to provide records by using a color signal of 600 to 800 KHz, a luminance signal reaching up to 8 MHz, and a Hi-Fi audio signal of 1 to 2 MHz, because their frequency response is 20 KHz at most. These types of three layered media have not been successfully produced.

It is desired to provide a magnetic recording medium comprising a non-magnetic support bearing a magnetic layer thereon, which is sure in travelling control, high in dispersibility and filling property, excellent in the surface property of the magnetic layer, high in S/N in both high and low frequency regions, having few dropouts and, especially, to provide a magnetic tape high in durability.

A magnetic recording medium is proposed. It comprises a non-magnetic support bearing a triple-laminated magnetic layer thereon. Except for the first magnetic layer coated on the support, the other magnetic layers are coated on the preceding magnetic layers which still remain wet after coating. It is preferable that the respective magnetic layers should not be mixed up substantially in any dried magnetic recording media. With respect to the carbon black contents of the 3-laminated layers, a carbon black content of a triple-laminated magnetic layer is 0.1 to 15 parts by weight to 100 parts by weight of the magnetic powder contained in the uppermost laminated layer and, preferably, the uppermost laminated layer contains no carbon black at all; the other laminated layers, i.e., the interlayer and the lowermost layer, contain carbon black in a total amount of 7 to 15 parts by weight to 100 parts by weight of magnetic powder contained in the uppermost layer, and, among the 3-laminated layers, the interlayer contains carbon black in an amount of 0.1 to 2.0 parts by weight.

The laminated interlayer and the laminated lowermost layer are to adjust the optical density of a magnetic tape as a whole so as to make the travelling control safe and sure so that static hindrance may be eliminated, and also to reduce the carbon black contents of the interlayer so as to prevent the laminated magnetic layers from making the surfaces thereof uneven, so that the surface roughness may be adjusted. In the laminated magnetic layers, the carbon black contents of a magnetic tape as a whole are so adjusted as to have a transmittance of not higher than 2% to light having a wavelength of 9000 Å, and the static hindranc can be eliminated.

When the above-mentioned total carbon black content exceeds 15 parts by weight (hereinafter referred to as a wt.), a binder-adhesion retention exceeds that of the carbon black, so that a layer becomes fragile. On the contrary, when the above-mentioned total carbon black content is less than 7 wt., the transmittance of the magnetic tape as a whole cannot be kept at 2% or lower, so that the travelling cannot be controlled stably.

Further, the surface roughness of a magnetic layer is to be not more than 0.01 $\mu$m and preferably within the range of 0.005 to 0.009 $\mu$m in terms of the average roughness of the center line of a cutoff of 0.08 mm.

Preferable mode in each laminated layer is summerized in the Table. The most preferable is shown in parentheses in the Table.

|  | Uppermost | Interlayer | Lowermost |
| --- | --- | --- | --- |
| Thickness [$\mu$m] | 0.1–1.0 (0.1–0.7) | 0.1–3.0 (0.5–1.5) | 1.0–3.0 (1.5–2.5) |
| Content of Magnetic powder in the layer [wt %] | 75–92 (76–88) | 75–88 (76–82) | 68–82 (70–80) |
| Particle size of carbon black [$\mu$m] | 30–60 (40–60) | 10–30 | 10–30 |
| Oil absorption of carbon black [ml/100 g] | not specified | over 100 | not more than 100 |
| Content of carbon black to 100 g of magnetic powder [g] | 0–1.0 (0) | 0–7.0 (0.1–2.0) | 0–15.0 (7.0–15.0) |
| | | Totally 7.0–15.0 | |

Figure 4:
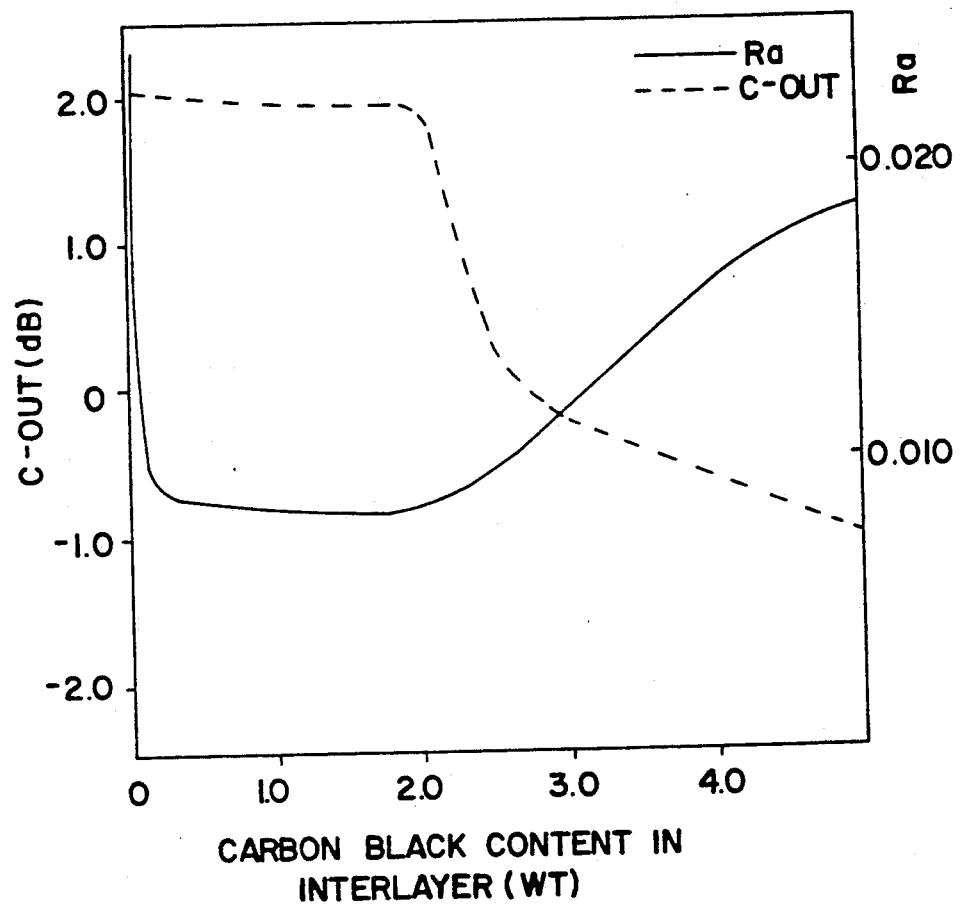
FIG. 4 is a graph exhibiting the relations among the carbon black contents of interlayers, the surface roughness, and C-out.

Next, FIG. 4 shows the relation between the roughness (Ra) of carbon black to the C-OUT thereof, with respect to the carbon black contents of an interlayer.

Figure 5:
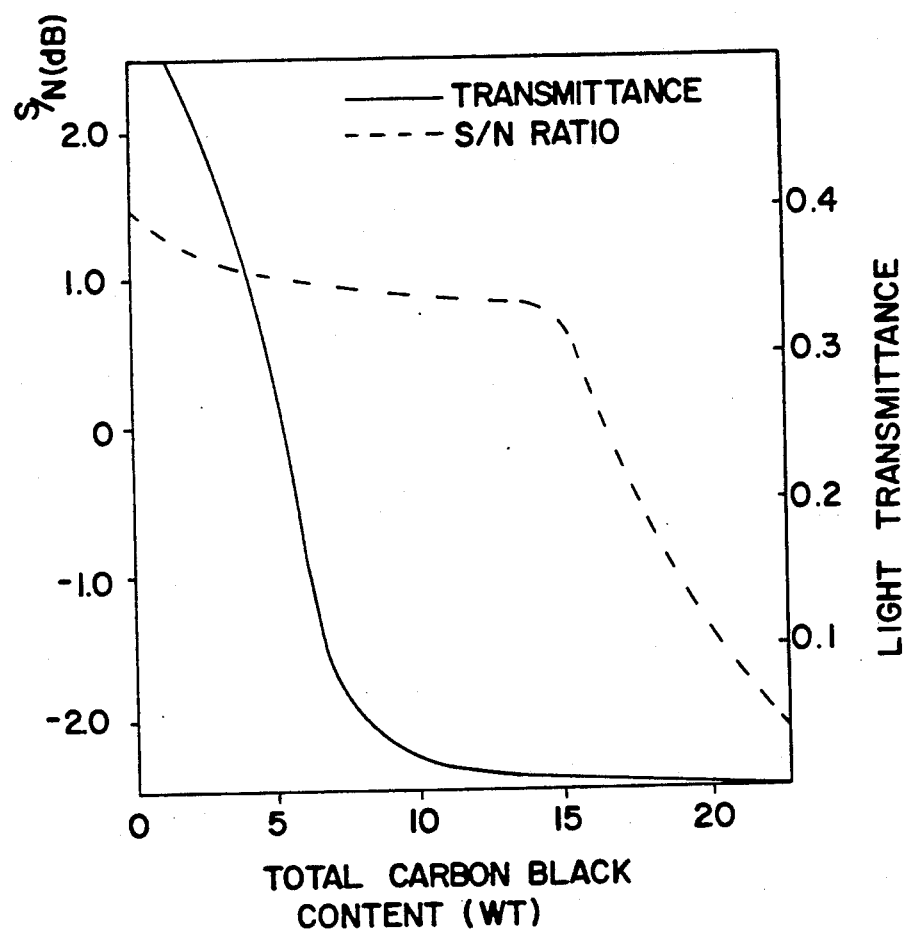
FIG. 5 is a graph exhibiting the relations among the total carbon black contents, the transmittance, and the S/Ns.

Furthermore, FIG. 5 shows the relations between the light transmittance at a wavelength of 900 nm and the S/N ratios, each corresponding to the changes in the total carbon black content varied by changing the carbon black contents of the lower layer.

In this case, Co-$\gamma$-Fe$_2$O$_3$ was used as the magnetic substance, and the dried thicknesses of the upper, middle and lower laminated magnetic layers were set to be 1.0, 1.5 and 2.5 $\mu$m, respectively. (According to the later-described Sample 1.

Among the carbon blacks, the carbon black for light-shielding use applicable to the invention include, for example, Raven 2000 having a specific surface area BET of 190 m$^2$/g and a particle size r of 18 m$\mu$, Raven 2100, 1170 and 1000 each manufactured by Colombian Carbon Company, and #100, #75, #40, #35 and #30 each manufactured by Mitsubishi Kasei Chemical Industrial Company.

The respective units of BET, r and the later-described DBP, i.e., m$^2$/gr, m$\mu$ and ml/100 gr, will be hereinafter omitted.

The conductive carbon black include, for example, the following: Conductex 975 having a BET of 250, a DBP oilabsorption (hereinafter abbreviated to DBP) of 170, and an r of 24, Conductex 900 having a BET of 125, an r of 27, Conductex 40-220 having an r of 20, and Conductex SC having a BET of 220, a DBP of 115, and an r of 20, each manufactured by Colombia Carbon Company; Vulcan XC-72 having a BET of 254 and an r of 30, and Vulcan P having a BET of 143, a DBP of 118, and an r of 20, each manufactured by Cabot Company; Raven 1040 and 420, Black-Pearls 2000 having an r of 15, and #44 manufactured by Mitsubishi Kasei Chemical Industries Company.

The other carbon blacks include, for example, Conductex-SC having a BET of 220, a DBP of 115, and an r of 20, manufactured by Colombia Carbon Company; Vulcan 9 having a BET of 140, a DBP of 114 and an r of 19, manufactured by Cabot Company; #80 having a BET of 117, a DBP of 113, and an r of 23, manufactured by Asahi Carbon Company; HS 100 having a BET of 32, a DBP of 180, and an r of 53, manufactured by Denki Kagaku Company; and #22B having a BET of 55, a DBP of 131, and an r of 40, #20B having a BET of 56, a DBP of 115, and an r of 40, #3500 having a BET of 47, a DBP of 187, and an r of 40. Besides the above, they include, for example, CF-9, #4000, and MA-600, each manufactured by Mitsubishi Kasei Chemical Industrial Company, Black-Pearls L, Monarck 800, Black-Pearls 700, Black-Pearls 1000, Black-Pearls 880, Black-Pearls 900, Black-Pearls 1300, Black-Pearls 2000, and Sterling V, each manufactured by Cabot Company; and Raven 410, Raven 3200, Raven 430, Raven 450, Raven 825, Raven 1255, Raven 1035, Raven 1000, Raven 5000, and Ketchen-Black FC.

The conventionally useful binders may be applied as the binders. From the viewpoint of the dispersion of magnetic powder particles and other fillers, it is preferable to use a modified resin having a functional group or a functional group capable of forming an intra-molecular salt thereinto and, it is particularly preferable to use a modified vinyl chloride resin, a modified poly-urethane resin or a modified polyester resin.

The functional groups of the above-given resins include, for example, the following groups: $-SO_3M$, $-OSO_2M$, $-COOM$, $$-\underset{\underset{OM^2}{|}}{\overset{\overset{OM^1}{|}}{P}}=O$$

(in which M represents any one of a hydrogen atom, lithium and sodium, and $M^1$ and $M^2$ each represent any one of a hydrogen atom, lithium, potassium, sodium and an alkyl group, provided, $M^1$ and $M^2$ may be the same as or different from each other.)

These functional groups may be obtained by the condensation, through a dehydrochlorination reaction, of a resin such as a vinyl chloride resin, a polyester resin, or a polyurethane resin and a compound containing an anionic functional group and a chlorine atom in the molecule thereof, such as $Cl-CH_2CH_2SO_3M$, $Cl-CH_2CH_2OSO_2M$, $Cl-CH_2COOM$, $$Cl-CH_2-\underset{\underset{OM^2}{|}}{\overset{\overset{OM^1}{|}}{P}}=O$$

(in which M, $M^1$ and $M^2$ are each synonymous with the same as given above.)

Among the above-given resins thus prepared, the vinyl chloride resins include, for example, a vinyl chloride-vinyl acetate-vinyl alcohol copolymer, a vinyl chloride-vinyl propionate-vinyl alcohol copolymer, a vinyl chloride-vinyl acetate-vinyl maleate-vinyl alcohol copolymer, and a vinyl chloride-vinylpropionate-vinyl maleate-vinyl alcohol copolymer.

Besides the above-given binders, if required, it is permitted to used, alone or in combination the conventional non-modified vinyl chloride resins, polyurethane resins, polyester resins, or those modified by introducing a simple polar group thereinto. And, it is also permitted to use, in combination, a cellulose resin, a phenoxy resin, a thermoplastic resin subject to a specific application system, a thermosetting resin, a reaction type resin, and an electron-beam-setting type resin.

The above-given resins may be used in combination to balance their merits and faults with each other by selecting the optimum points of the kinds and quantities as the binders of the component layers of the invention, such as a magnetic layer, a back-coat layer, a protective layer, or a adhesive layer.

In the invention, polyisocyanate may be added as a setting agent into the above-mentioned binders.

The applicable aromatic polyisocyanates include, for example, tolylene diisocyanate (TDC) and the adducts of those polyisocyanates and an activated hydrogen compound. The preferable average molecular weight thereof should be within the range of 100 to 3,000.

The aliphatic polyisocyanates include, for example, hexamethylene diisocyanates and the adducts of these isocyanates and an activated hydrogen compound. Among the aliphatic polyisocyanates and the adducts of those polyisocyanates and the activated hydrogen compounds, the preferable ones have a molecular weight within the range of 100 to 3,000. Among the aliphatic polyisocyanates, a nonalicyclic polyisocyanate and the adducts of those compounds and activated hydrogen compounds are preferably used.

The above-mentioned polyisocyanates may be added in a proportion of 1/20 to 7/10 to the weight of the binders used and, more preferably, 1/10 to 1/2.

The dispersing agents applicable to the interlayers include, for example, lecithin, phosphoric acid ester, amine compound, alkyl sulfate, fatty acid amide, higher alcohol, polyethylene oxide, sulfosuccinic acid, sulfosuccinic acid ester, the known surfactants, and the salts thereof. Besides the above, the salts of polymeric dispersing agents having an anionic organic group such as $-COOH$ or $-PO_3H$ may also be used. These dispersing agents may be used independently or in combination. These dispersing agents may be added in an amount within the range of 1 to 20 parts by weight to 100 parts by weight of the binders used.

The antistatic agents include, for example, conductive powder such as graphite, tin oxide-antimony oxide compounds, titanium oxide-tin oxide-antimony oxide compounds, as well as carbon black; natural surfactants such as saponin; nonionic surfactants such as those of the alkylene oxide type, the glycerol type, and the glycidol type; cationic surfactants such as higher alkylamines, quaternary ammonium salts, pyridine and the other heterocyclic compounds, phosphoniums, and sulfoniums; anionic surfactants such as those containing an acid group, e.g., a carboxylic acid group, a sulfonic acid group, a phosphoric acid group, a sulfuric acid ester group, or a phosphoric acid ester group; and amphoteric surfactants such as amino acids, aminosulfonic acids, sulfonic acid esters or phosphoric acid esters each of alcohol. The magnetic layers relating to the invention contain at least magnetic powder and binders and, if required, they may also contain a dispersing agent and a lubricant.

Magnetic materials include, for example, magnetic oxides such as $\gamma$-$Fe_2O_3$, Co-containing $\gamma$-$Fe_2O_3$, Co-adhering $\gamma$-$Fe_2O_3$, $Fe_3O_4$, Co-containing $Fe_3O_4$, Co-adhering $Fe_3O_4$, and $CrO_2$. To be more concrete, such magnetic oxides include, for example, various kinds of ferromagnetic substances such as magnetic metal powder mainly comprising, Fe, Ni, Co and/or Al, for example, Fe, Ni, Co, Fe—Ni alloy, Fe—Co alloy, Fe—Al alloy, Fe—Al—Ni alloy, Fe—Ni—P alloy, Fe—Ni—Co alloy, Fe—Mn—Zn alloy, Fe—Ni—Zn alloy, Fe—Co—Ni—Cr alloy, Fe—Co—Ni alloy, Co—Ni alloy, Co—P alloy, Co—Cr alloy.

The additives to the above-given magnetic metal materials may include the elements of Si, Cu, Zn, Al, P, Mn, and Cr, or the compounds thereof.

Further, hexahedral ferrites such as barium ferrite, and iron nitrides may also be used.

As for the binders, setting agents, dispersing agents, antistatic agents and fillers, those described for the above-mentioned interlayers may also be appropriate. The lubricants having conventionally been used may also be used.

Furthermore, if required, an abrasives may be added therein.

The applicable abrasives include materials having generally been used, such as fused alumina, silicon carbide, chromium oxide, corundum, artificial corundum, artificial diamond, garnet, and emery mainly comprising corundum and magnetite. These abrasives are used to have an average particle size within the range of 0.05 to 5 $\mu$m and, more preferably, 0.1 to 2 $\mu$m. The are added in an amount within the range of 1 to 20 parts by weight to 100 parts by weight of magnetic powder used.

Into the paints for the above-mentioned interlayers and magnetic layers, the following solvents or diluted solvents may be used when the paints are coated: Ketones such as acetone, methylethyl ketone, methylisobutyl ketone, and cyclohexane; alchols such as methanol, ethanol, propanol, and butanol; easters such as methyl acetate, ethyl acetate, butyl acetate, ethyl lactate, and ethyleneglycol cello- acetate; ethers such as glycoldimethyl ether, glycol- monoethyl ether, dioxane, and tetrahydrofuran; aromatic hydrocarbons such as benzene, toluene, and xylene; and halogenohydrocarbons such as methylene chloride, ethylene chloride, carbon tetrachloride, chloroform, and dichlorobenzene.

The materials of the supports include, for example, polyesters such as polyethyleneterephthalate and polyethylene-2,6-naphthalate; polyolefins such as polypropylene; cellulose derivatives such as cellulose triacetate and cellulose diacetate; and plastics such as polyamide and polycarbonate. Besides the above, metals such as Cu, Al and Zn, glass, boron nitride, Si-carbide, and ceramics.

The support thickness is of the order of about 3 to 100 $\mu$m and preferably 5 to 50 $\mu$m when it is in the form of the film or sheet, and it is of the order of 30 $\mu$m to 10 mm when it is in the form of a disk or card. When it is in the form of a drum, it is used in the cylindrical form, and the shapes thereof may be selected according to a recorder used.

Between the support and a back-coat layer or magnetic layer, an interlayer may be interposed to improve the adhesive property.

Coating methods considered to be effective to form the above-described laminated magnetic layers on such a support include, for example, a simultaneous or successive extrusion coating method, a reverse roll with extrusion coating method, or a gravure roll with extrusion coating method applicable in the case of a wet-on-wet coating system.

Further, it may also be considered to use a combination of an air-doctor coating method, a blade coating method, an air-knife coating method, a squeeze coating method, an impregnation coating method, a transfer-roll coating method, a kiss coating method, a cast coating method and a spray coating method.

In the case of a wet-on-dry coating system, any combinations of the above-mentioned coating method may be used.

Samples 1 to 7

The magnetic paints of samples were prepared in accordance with magnetic paint preparation formulas A (for the upper layer), B (for the interlayer), and C (for the lower layer) each indicated in the following Table 3. The amounts indicated in the magnetic paint preparation formulas are represented by the weight parts in terms of the same weight unit.

TABLE 3

| | Formula | | |
|---|---|---|---|
| Component | Formula A (for the upper layer) | Formula B (for the interlayer) | Formula C (for the lower layer) |
| Co-$\gamma$-$Fe_2AO_3$ | 100 | 100 | 100 |
| Sulfo-modified vinyl chloride resin | 17 | 13 | 12 |
| Polyurethane resin | 4 | 5 | 3 |
| $\alpha$-$Al_2O_3$ | 3 | 2 | 5 |
| Carbon black | a | b | c |
| Myristic acid | 1 | 2 | 2 |
| Stearic acid | 1 | 1 | 2 |
| Butyl stearate | 1 | 1 | 1 |
| Cyclohexanone | 120 | 150 | 100 |
| Methylethyl ketone | 120 | 150 | 80 |
| Toluene | 80 | 100 | 60 |

C = In the table, a, b, and c are shown in Table 4.

The compositions of Formulas A, B and C indicated in Table 1 were dispersed each in a ball mill for 24 hours, respectively, and 6 parts of multifunctional isocyanate were then added as the setting agent. Each of the resulting matters was filtrated through a 1 $\mu$m-mesh filter. The filtrate was coated on a 13 $\mu$m-thick polyethyleneterephthalate base so as to make the dried thicknesses of the upper, intermediate and lower layers to be 1.0 $\mu$m, 1.5 $\mu$m and 2.5 $\mu$m, respectively, so that each of the sample films was prepared.

A tape Sample 5 was prepared in the same manner as in Inventive Sample-1 except that the upper layer was eliminated to make it to be a double-layered tape.

Eliminating the interlayer, a double-layered tape Samples 6 and 7 were so prepared as to comprise the uppermost and the lowermost layers as shown in Table 4.

Each of the resulting films were subjected to a super-calender treatments. They were slitted away by ½-inch wide, so that the inventive tape Samples 1 to 7 were obtained.

The characteristics of each sample were measured. The results hereof are shown in Table 4.

(b) C-out and S/N ... were obtained by measuring the playback noise voltage with an instrument Model HR-7100 manufactured by Japan Victor Company upon recording 4.5 MHz with a maximum recording current.

(c) Drop-out number ... was obtained by measuring the drop-out number at 15 μsec/min. with a virgin tape and the tape after travelling 200 passes, with the use of a dropout counter Model Shibasoku VHO 1BZ.

Samples 8 to 15 are conventional 3-layer-laminated

TABLE 4

| | C.B. content (by part) | | | Total CB content | Roughness Ra/Rmax | Electro-magnetic property | | | Durability Dogear found on edges |
|---|---|---|---|---|---|---|---|---|---|
| | The upper layer a | The inter-layer b | The lower layer c | | | C-OUT | S/N | D/O | |
| Sample-1 | 0 | 0.1 | 6.9 | 7.0 | 0.008/0.089 | +2.1 | +0.8 | 3 | No dogear found |
| -2 | 0 | 0.1 | 14.9 | 15.0 | 0.008/0.094 | +2.1 | +0.9 | 4 | No dogear found |
| -3 | 0 | 2.0 | 5.0 | 7.0 | 0.009/0.093 | +2.0 | +0.9 | 2 | No dogear found |
| -4 | 0 | 2.0 | 13.0 | 15.0 | 0.009/0.112 | +1.9 | +0.8 | 3 | No dogear found |
| -5 | — | 0.1 | 6.9 | 7.0 | 0.018/0.246 | 0 | 0 | 16 | No dogear found |
| -6 | 0 | — | 13.0 | 13.0 | 0.021/0.281 | −0.8 | −0.1 | 45 | Slight dogear found |
| -7 | 13.0 | — | 0 | 13.0 | 0.027/0.369 | −2.1 | −0.8 | 21 | Dogear found on the whole |

Rmax: Maximum roughness

In Samples 1 to 4 each containing carbon black, the virgin tapes and the tapes passed 200 times were low in frictional resistance had little tape damage, and they were also excellent in skew and jitter properties because of the stable tape-travelling property. Further, the tape-surface roughness can also be made very fine, the C-out and S/N thereof did not deteriorate, the light-shielding property was satisfactory, there was no problem in the tape-travelling control, and the repetitive tape-travelling durability was also excellent.

On the other hand, Samples 5 to 7 were higher in frictional resistance, defective in stable tape-travelling property, and worse in skew and chroma properties, and inferior also in chroma-S/N.

Methods of Measuring Inventive and Comparative Samples (a) Surface roughness Ra and Rmax (μm) ... were obtained by measuring the sample surfaces each having alength of 2.5 mm with a three-dimensional roughness measuring instrument Model SE-3FK manufactured by Kosaka Research Laboratories, at a cut-off of 0.25 and a stylus force of 30 mg.

magnetic recording medium. The Samples 8 to 10 were prepared by coating Composition A in the Table 4 on the polyethyleneterphthalate support by means of reverse roll coating machine so as to have a dry thickness shown in the Table 5. The intermediate layer was coated on the lowermost layer which was coated and calendared after drying, and the uppermost layer was coated on the dried and calendared intermediate layer. The Sample 11 was prepared in the same way as the Sample 10 but by coating the Composition B instead of A. The Samples 12 to 14 were prepared by coating Composition A on the polyethyleneterephthalate support by means of extrusion coating machine. The intermediate layer and the uppermost layer was each coated on the lower layer when it was wet. The sample 15 was prepared in the same way in the Sample 12 by coating Composition B instead of A.

The electric characteristics and the coating evenness are summarised in the Table 5.

Hereafter L, I and U in the Tables represent a lowermost, intermediate and uppermost layer respectively. The numbers in the Tables represent a content in weight parts when not otherwise specified.

TABLE 4

| | Composition A | | | Composition B | | |
|---|---|---|---|---|---|---|
| Layer | L | I | U | L | I | U |
| Magnetic powder | | | | | | |
| Material | γ-Fe$_2$O$_3$ | γ-Fe$_2$O$_3$ | Co-γ-Fe$_2$O$_3$ | γ-Fe$_2$O$_3$ | Fe$_3$O$_4$ | Co-γ-Fe$_2$O$_3$ |
| Hc(Oe) | 275 | 380 | 570 | 200 | 350 | 570 |
| Content | 100 | 100 | 100 | 100 | 100 | 100 |
| Copolymer of vinylchloride/vinylidenchloride | 5 | 25 | 25 | 5 | 1 | 25 |
| Urethane prepolymer | 25 | 5 | — | 20 | 20 | — |
| Urethane elastomer | 0 | 0 | 5 | 0 | 0 | 5 |
| Methylisobutyl ketone | 100 | 100 | — | 60 | 60 | 100 |
| Toluene | 100 | 100 | 100 | 60 | 60 | 100 |
| NCO derivative | 1.5 | 1.5 | — | 0.5 | 0.5 | — |
| Methylethyl ketone | 100 | 100 | 100 | 180 | 180 | 100 |
| Fatty acid | — | — | 0.5 | — | — | — |

TABLE 4-continued

| Layer | Composition A | | | Composition B | | |
|---|---|---|---|---|---|---|
| | L | I | U | L | I | U |
| Silicone oil | — | — | — | — | — | 0.1 |

TABLE 5

| Sample No. | Layer thickness (μm) Layer | | | | Coating Evenness Layer | | | Electric Characteristics Lumi S/N (dB) |
|---|---|---|---|---|---|---|---|---|
| | L | I | U | Total | L | I | U | |
| 8 | 2.5 | 1.5 | 1.5 | 5.5 | A | B | B | 0 |
| 9 | 2.5 | 1.0 | 1.0 | 4.5 | A | B | C | −6.5 |
| 10 | 2.5 | 0.7 | 0.3 | 3.5 | A | C | C | −17.0 |
| 11 | 2.5 | 0.7 | 0.3 | 3.5 | A | C | C | −21.0 |
| 12 | 2.5 | 1.5 | 1.5 | 5.5 | A | A | A | 0 |
| 13 | 2.5 | 1.0 | 1.0 | 4.5 | A | A | A | +1.8 |
| 14 | 2.5 | 0.7 | 0.3 | 3.5 | A | A | A | +2.4 |
| 15 | 2.5 | 0.7 | 0.3 | 3.5 | A | A | A | +2.0 |

A: Coated evenly.
B: Coated but uneven thickness.
C: Hard to coat.

Other samples of 3-layer-laminated magnetic recording medium are prepared. Each component of coating material for the layer of the samples is shown in Table 6, other than for the samples 25, 26 and 27. In these samples the coating composition of the intermediate layer is substituted with a mixture of 50% of the lowest layer and 50% of outermost layer of the samples 16, 17 and 18, respectively. The intermediate layer or the outer most layer is coated on the previously coated layer when it is wet, or simultaneously with the layer under the layer. In Table 6, Co-23, Co-34 and Fe—ZN represent for Co-$\gamma$-Fe$_2$O$_3$, Co-$\gamma$-Fe$_3$O$_4$ and Fe—Zn—Ni, respectively. The electric characteristics, roughness, drop out and are tested in the same way as for the samples 1 to 7. Sliding noise is given in the following way;

1. The system noise of the sample is measured by spectrum analyzer when the tape does not run.
2. The noise of a running sample is measured by the spectrum analyzer for ten minute ten times. The average noise level at 6 to 8 MHz is expressed taking the system noise as a standard (0 dB). The noize level of a sample is expressed as a relative value taking a comercial magnetic recording tape, SGR product of Konica Corporation as a standard (100%).

The test result is summarized in Table 7.

TABLE 6

| | Sample No. | | | | | | | | | | | |
|---|---|---|---|---|---|---|---|---|---|---|---|---|
| | 16 | | | 17 | | | 18 | | | 19 | | |
| | Layer | | | | | | | | | | | |
| | L | I | U | L | I | U | L | I | U | L | I | U |
| Magnetic powder | | | | | | | | | | | | |
| Material | Co-23 | Co-23 | Co-23 | Co-34 | Co-23 | Co-23 | Co-34 | Co-34 | Co-23 | Co-34 | Co-34 | Co-34 |
| Content | | | | | 100 (in all layers) | | | | | | | |
| Length of longer axis (μm) | 0.35 | 0.26 | 0.19 | 0.30 | 0.20 | 0.15 | 0.38 | 0.25 | 0.16 | 0.35 | 0.26 | 0.19 |
| HC (Oe) | 600 | 700 | 800 | 650 | 750 | 900 | 550 | 750 | 950 | 600 | 700 | 800 |
| BET (m$^2$/g) | 32 | 38 | 45 | 35 | 42 | 55 | 30 | 40 | 55 | 32 | 38 | 45 |
| Fe$^{2+}$/Fe$^{3+}$ (%) | 6 | 8 | 5 | 38 | 8 | 3 | 34 | 28 | 4 | 28 | 24 | 32 |
| Sulfo-modified vinyl chloride resin | | | | 12 (in all layers) | | | | | | 10 (in all layers) | | |
| Polyurethane resin | | | | 6 (in all layers) | | | | | | 10 (in all layers) | | |
| $\alpha$-Al$_2$O$_3$ | 0 | 0 | 3 | 0 | 0 | 3 | 0 | 0 | 4 | 0 | 1 | 3 |
| Particle size (μm) | — | — | 0.2 | — | — | 0.2 | — | — | 0.3 | — | 0.08 | 0.2 |
| Myristic acid | | | | 1 (in all layers) | | | | | | | | |
| Stearic acid | | | | 1 (in all layers) | | | | | | | | |
| Butylstearate | | | | 1 (in all layers) | | | | | | | | |
| Cyclohexane | | | | 150 (in all layers) | | | | | | | | |
| Methylethyl ketone | | | | 100 (in all layers) | | | | | | | | |
| Toluene | | | | 100 (in all layers) | | | | | | | | |
| Carbon black | 7 | 3 | 0.2 | 5 | 3 | 0.2 | 4 | 2 | 0.4 | 0 | 3 | 0.2 |
| Particle size (μm) | 20 | 20 | 40 | 20 | 40 | 60 | 20 | 30 | 50 | — | 20 | 40 |
| Polyisocyanate | | | | 5 (in all layers) | | | | | | | | |
| Layer thickness (μm) | 2.5 | 0.7 | 0.3 | 2.5 | 0.7 | 0.3 | 2.5 | 0.7 | 0.3 | 2.5 | 0.5 | 0.3 |

| | Sample No. | | | | | | | | | | | |
|---|---|---|---|---|---|---|---|---|---|---|---|---|
| | 20 | | | 21 | | | 22 | | | 23 | | |
| | Layer | | | | | | | | | | | |
| | L | I | U | L | I | U | L | I | U | L | I | U |
| Magnetic powder | | | | | | | | | | | | |
| Material | Co-23 | Co-34 | Co-34 | Co-23 | Co-23 | Co-34 | Co-23 | Co-23 | Fe—Al | Co-23 | Co-23 | Fe—ZN |
| Content | | | | | 100 (in all layers) | | | | | | | |
| Length of longer axis (μm) | 0.39 | 0.20 | 0.15 | 0.39 | 0.20 | 0.15 | 0.32 | 0.20 | 0.15 | 0.39 | 0.20 | 0.16 |
| HC (Oe) | 650 | 750 | 900 | 550 | 750 | 950 | 700 | 900 | 1200 | 550 | 950 | 1500 |
| BET (m$^2$/g) | 35 | 42 | 55 | 35 | 42 | 55 | 40 | 50 | 62 | 30 | 50 | 65 |
| Fe$^{2+}$/Fe$^{3+}$ (%) | 6 | 34 | 28 | 8 | 6 | 26 | 6 | 7 | — | 8 | 4 | — |

TABLE 6-continued

| | | | | | | | | | | | |
|---|---|---|---|---|---|---|---|---|---|---|---|
| Sulfo-modified vinyl chloride resin | | 10 (in all layers) | | | | | | 8 (in all layers) | | | |
| Polyurethane resin | | 10 (in all layers) | | | | | | 6 (in all layers) | | | |
| α-Al$_2$O$_3$ | 0 | 0 | 4 | 0 | 0 | 4 | 0 | 4 | 4 | 0 | 0 | 3 |
| Particle size (μm) | — | — | 0.3 | — | — | 0.3 | — | 0.4 | 0.2 | — | — | 0.2 |
| Myristic acid | | | | | | 1 (in all layers) | | | | | | |
| Stearic acid | | | | | | 1 (in all layers) | | | | | | |
| Butylstearate | | | | | | 1 (in all layers) | | | | | | |
| Cyclohexane | | | | | | 150 (in all layers) | | | | | | |
| Methylethyl ketone | | | | | | 100 (in all layers) | | | | | | |
| Toluene | | | | | | 100 (in all layers) | | | | | | |
| Carbon black | 3 | 1 | 0.2 | 5 | 2 | 0.2 | 7 | 7 | 0.2 | 7 | 7 | 0.2 |
| Particle size (μm) | 20 | 20 | 40 | 20 | 20 | 40 | 20 | 20 | 40 | 20 | 20 | 40 |
| Polyisocyanate | | | | | | 5 (in all layers) | | | | | | |
| Layer thickness (μm) | 2.5 | 0.5 | 0.3 | 2.5 | 0.5 | 0.3 | 2.0 | 0.7 | 0.2 | 2.0 | 0.7 | 0.2 |

| | Sample No. | | | | | | | | | | | |
|---|---|---|---|---|---|---|---|---|---|---|---|---|
| | 24 | | | 28 | | | 29 | | | 30 | | |
| | Layer | | | | | | | | | | | |
| | L | I | U | L | I | U | L | I | U | L | I | U |
| Magnetic powder | | | | | | | | | | | | |
| Material | Co-23 | Co-23 | Ba—Fe | Co-23 | Co-23 | Co-23 | Co-23 | Co-23 | Co-23 | Co-23 | Co-23 | Co-23 |
| Content | | | | | | 100 (in all layers) | | | | | | |
| Length of longer axis (μm) | 0.35 | 0.20 | 0.19 | 0.38 | 0.25 | 0.16 | 0.38 | 0.25 | 0.16 | 0.38 | 0.25 | 0.16 |
| HC (Oe) | 600 | 900 | 1100 | 550 | 750 | 950 | 550 | 750 | 950 | 550 | 750 | 950 |
| BET (m$^2$/g) | 32 | 48 | 60 | 30 | 40 | 55 | 30 | 40 | 55 | 30 | 40 | 55 |
| Fe$^{2+}$/Fe$^{3+}$ (%) | 4 | 6 | — | 6 | 8 | 4 | 6 | 8 | 4 | 6 | 8 | 4 |
| Sulfo-modified vinyl chloride resin | | 8 (in all layers) | | 12 | 13 | 17 | 12 | 13 | 17 | 12 | 13 | 17 |
| Polyurethane resin | | 6 (in all layers) | | 3 | 5 | 4 | 3 | 5 | 4 | 3 | 5 | 4 |
| α-Al$_2$O$_3$ | 0 | 3 | 3 | 5 | 2 | 3 | 5 | 2 | 3 | 5 | 2 | 3 |
| Particle size (μm) | — | 0.2 | 0.2 | 0.08 | 0.2 | 0.2 | 0.08 | 0.2 | 0.2 | 0.08 | 0.2 | 0.2 |
| Myristic acid | | 1 (in all layers) | | 2 | 2 | 1 | 2 | 2 | 1 | 2 | 2 | 1 |
| Stearic acid | | 1 (in all layers) | | 2 | 1 | 1 | 2 | 1 | 1 | 2 | 1 | 1 |
| Butylstearate | | 1 (in all layers) | | 0 | 1 | 0 | 0 | 1 | 0 | 0 | 1 | 0 |
| Cyclohexane | | 150 (in all layers) | | 100 | 150 | 120 | 100 | 150 | 120 | 100 | 150 | 120 |
| Methylethyl ketone | | 100 (in all layers) | | 80 | 150 | 120 | 80 | 150 | 120 | 80 | 150 | 120 |
| Toluene | | 100 (in all layers) | | 160 | 100 | 80 | 160 | 100 | 80 | 160 | 100 | 80 |
| Carbon black | 7 | 7 | 0.2 | 6.9 | 0.1 | 0 | 6.9 | 0.1 | 0 | 6.9 | 0.1 | 0 |
| Particle size (μm) | 20 | 20 | 40 | 40 | 20 | — | 40 | 20 | — | 40 | 20 | — |
| Polyisocyanate | | | | | | 5 (in all layers) | | | | | | |
| Layer thickness (μm) | 2.0 | 0.7 | 0.2 | 2.5 | 1.5 | 1.0 | 2.5 | 1.5 | 1.0 | 2.5 | 1.5 | 1.0 |

| | Sample No. | | | | | | | | | | | |
|---|---|---|---|---|---|---|---|---|---|---|---|---|
| | 31 | | | 32 | | | 33 | | | 34 | | |
| | Layer | | | | | | | | | | | |
| | L | I | U | L | I | U | L | I | U | L | I | U |
| Magnetic powder | | | | | | | | | | | | |
| Material | Co-23 | Co-23 | Co-23 | Co-23 | Co-23 | Co-23 | Co-23 | Co-23 | Co-23 | Co-23 | Co-23 | Co-23 |
| Content | 100 | 100 | 100 | | | 100 (in all layers) | | | | | | |
| Length of longer axis (μm) | 0.38 | 0.25 | 0.16 | 0.38 | 0.25 | 0.16 | 0.38 | 0.25 | 0.16 | 0.38 | 0.25 | 0.16 |
| HC (Oe) | 550 | 750 | 950 | 550 | 750 | 950 | 550 | 750 | 950 | 550 | 750 | 950 |
| BET (m$^2$/g) | 30 | 40 | 55 | 30 | 40 | 55 | 30 | 40 | 55 | 30 | 40 | 55 |
| Fe$^{2+}$/Fe$^{3+}$ (%) | 6 | 8 | 4 | 6 | 8 | 4 | 6 | 8 | 4 | 6 | 8 | 4 |
| Sulfo-modified vinyl chloride resin | 12 | 13 | 17 | | | | 12 (in all layers) | | | | | |
| Polyurethane resin | 3 | 5 | 4 | | | | 6 (in all layers) | | | | | |
| α-Al$_2$O$_3$ | 5 | 2 | 3 | 0 | 0 | 4 | 0 | 0 | 3 | 0 | 1 | 4 |
| Particle size (μm) | 0.08 | 0.2 | 0.2 | — | — | 0.2 | — | — | 0.3 | — | 0.2 | 0.3 |
| Myristic acid | 2 | 2 | 1 | | | | 1 (in all layers) | | | | | |
| Stearic acid | 1 | 1 | 1 | | | | 1 (in all layers) | | | | | |
| Butylstearate | 0 | 1 | 0 | | | | 1 (in all layers) | | | | | |
| Cyclohexane | 100 | 150 | 120 | | | | 150 (in all layers) | | | | | |
| Methylethyl ketone | 80 | 150 | 120 | | | | 100 (in all layers) | | | | | |
| Toluene | 160 | 100 | 80 | | | | 100 (in all layers) | | | | | |
| Carbon black | 13.0 | 2.0 | 0 | 8 | 3 | 0 | 8.1 | 0.4 | 0 | 10 | 2 | 0 |

TABLE 6-continued

| | | | | | | | | | | | | |
|---|---|---|---|---|---|---|---|---|---|---|---|---|
| Particle size (μm) | 30 | 20 | — | 20 | 20 | 40 | 40 | 50 | — | 20 | 50 | — |
| Polyisocyanate | 5 | 5 | 5 | 5 (in all layers) | | | | | | | | |
| Layer thickness (μm) | 2.5 | 1.5 | 1.0 | 2.0 | 0.5 | 0.3 | 2.0 | 0.5 | 0.3 | 2.0 | 0.5 | 0.3 |

TABLE 7

| Sample No. | Chroma (dB) Out | Chroma (dB) S/N | Roughness Ra | Roughness Rt | Drop out Number/min | Sliding noise (%) |
|---|---|---|---|---|---|---|
| 16 | +2.6 | +1.2 | 0.007 | 0.064 | 2 | 80 |
| 17 | +2.8 | +1.5 | 0.005 | 0.075 | 2 | 85 |
| 18 | +2.5 | +1.1 | 0.005 | 0.055 | 3 | 80 |
| 19 | +2.7 | +1.3 | 0.007 | 0.084 | 4 | 75 |
| 20 | +2.7 | +1.4 | 0.006 | 0.073 | 2 | 80 |
| 21 | +2.6 | +1.6 | 0.005 | 0.091 | 2 | 75 |
| 22 | +3.2 | +2.9 | 0.003 | 0.045 | 3 | 60 |
| 23 | +3.0 | +2.9 | 0.004 | 0.036 | 4 | 60 |
| 24 | +3.1 | +3.0 | 0.003 | 0.042 | 4 | 60 |
| 25 | +2.6 | +2.6 | 0.006 | 0.079 | 2 | 80 |
| 26 | +2.8 | +2.7 | 0.006 | 0.082 | 3 | 80 |
| 27 | +2.9 | +2.6 | 0.005 | 0.073 | 4 | 85 |
| 28 | +2.1 | +3.8 | 0.008 | 0.089 | 2 | 40 |
| 29 | +2.1 | +3.9 | 0.008 | 0.094 | 1 | 40 |
| 30 | +2.0 | +3.9 | 0.009 | 0.093 | 1 | 50 |
| 31 | +1.9 | +3.8 | 0.009 | 0.112 | 1 | 50 |
| 32 | +2.0 | +3.9 | 0.008 | 0.131 | 2 | 50 |
| 33 | +2.1 | +3.8 | 0.008 | 0.121 | 1 | 50 |
| 34 | +2.1 | +4.1 | 0.008 | 0.141 | 1 | 50 |

What is claimed is:

1. An apparatus for coating a flexible support moving in a downstream direction, said apparatus comprising a first slot between a front edge and a center edge downstream thereof, a second slot between said center edge and a back edge downstream thereof, a coating solution extruded continuously from each said slot onto said flexible support which passes continuously along a front edge surface on said front edge, a center edge surface on said center edge, and a back edge surface on said back edge in that order, a straight line portion on said front edge surface extending to a downstream terminal end of said front edge, said straight line portion not exceeding 1 mm in length in said downstream direction, a portion of at least one of said center surface and said back surface protruding toward said support beyond an extension line from said straight line portion, a portion of said back edge protruding toward said support beyond a tangent line to a downstream end of said center edge surface.

2. The apparatus of claim 1 wherein said portion of said center edge surface which protrudes toward said support beyond said extension line is arcuately concave toward said support and has a radius of curvature in the range of 2 mm to 25 mm.

3. The apparatus of claim 1 wherein said portion of said back edge surface which protrudes toward said support beyond said tangent line is arcuately concave toward said support and has a radius of curvature in the range of 2 mm to 25 mm.

4. The apparatus of claim 1 wherein said center edge surface has a radius of curvature $R_1$ and said center edge has a thickness in said downstream direction in the range of $R_1/20$ to $R_1$.

5. The apparatus of claim 1 wherein said back edge surface has a radius of curvature $R_2$ and said center edge has a thickness in said downstream direction of $R_2/20$ to $R_2$.

6. The apparatus of claim 1 wherein a straight line from said downstream end of said center edge surface tangent to said back edge surface forms an angle $\theta$ with said tangent line, said angle being greater than 0° and less than 38°.

7. The apparatus of claim 1 wherein portions of both said center surface and said back surface protrude toward said support beyond said extension line.

* * * * *